(12) United States Patent
Vasquez et al.

(10) Patent No.: US 9,812,853 B2
(45) Date of Patent: Nov. 7, 2017

(54) INTELLIGENT SWITCHABLE DEVICE

(71) Applicants: Hector M Vasquez, Williamsburg, MI (US); Martin Kuttner, Holly Springs, NC (US)

(72) Inventors: Hector M Vasquez, Williamsburg, MI (US); Martin Kuttner, Holly Springs, NC (US)

(73) Assignee: Early Rescue Solutions, LLC

( * ) Notice: Subject to any disclaimer, the term of this patent is extended or adjusted under 35 U.S.C. 154(b) by 216 days.

(21) Appl. No.: 14/924,702

(22) Filed: Oct. 27, 2015

(65) Prior Publication Data
US 2017/0117697 A1  Apr. 27, 2017

(51) Int. Cl.
*H02H 3/00* (2006.01)
*H02H 1/00* (2006.01)
*H02H 3/20* (2006.01)

(52) U.S. Cl.
CPC ........ *H02H 1/0007* (2013.01); *H02H 1/0061* (2013.01); *H02H 3/20* (2013.01)

(58) Field of Classification Search
CPC .................................................. H02H 1/0007
USPC ........................................................ 361/91.1
See application file for complete search history.

(56) References Cited

U.S. PATENT DOCUMENTS

| 6,176,718 | B1 | 1/2001 | Skarie | |
|---|---|---|---|---|
| 6,473,281 | B1 * | 10/2002 | Kornblit | H02H 3/0935 340/650 |
| 9,172,233 | B2 * | 10/2015 | Vasquez | H02H 1/0092 |

* cited by examiner

*Primary Examiner* — Stephen W Jackson
(74) *Attorney, Agent, or Firm* — Mitchell M. Musial, PLLC

(57) ABSTRACT

Disclosed herein is an intelligent switchable device for selectively conducting electricity based on the condition of a branch circuit. The device contains at least one sensor for producing a signal indicative of a condition. The device is capable of transmitting data and communications as well as receiving data, including remote instructions and rules. The device is capable of storing rules for determining whether to render the switch conductive or non-conductive. An optical prong detector is provided to determine whether both the hot and neutral prongs of a plug have been inserted into the receptacle. The receptacle provides conductance upon determination of insertion of a plug into the receptacle. Additional features include GFI detection, current detection, heat detection, warning lights and an audible alarm. The receptacle includes communication abilities with remote devices to transmit data indicative of the state of the device.

7 Claims, 16 Drawing Sheets

INTELLIGENT SWITCHABLE DEVICE

CROSS-REFERENCE TO RELATED APPLICATIONS

This application is a continuation in part of U.S. application Ser. No. 13/726,608, entitled "SYSTEM AND METHOD FOR MONITORING AN ELECTRICAL DEVICE" filed Dec. 25, 2012, now U.S. Pat. No. 9,172,233, which is a continuation-in-part of U.S. application Ser. No. 12/493,522, entitled "Surveillance Device Detection With Countermeasures" which was filed on Jun. 29, 2009, now U.S. Pat. No. 8,340,252 and a continuation-in-part of U.S. patent application Ser. No. 12/322,733, entitled "Safety Socket" which was filed on Feb. 6, 2009, which claimed the benefit of U.S. Provisional Application 61/063,951, which was filed on Feb. 6, 2008; the contents of which are incorporated herein by reference in their entirety.

FIELD OF TECHNOLOGY

A device for selectively conducting electrical power, and more particularly, an improved switchable electrical socket having the ability to learn.

BACKGROUND

Electrical receptacles, also known as outlets, wall plugs, etc., which in residential applications are commonly found mounted in an outlet box fixed within a wall and attached by terminals to an insulated powerline. By example, the typical powerline used for residential purposes has a line that has three wires, the first conducts the AC power wave, which is commonly known as the "hot", the second this a return line, commonly referred to as "neutral" and a solid copper conductor commonly referred to as "ground".

The typical receptacle has two parallel slots, and a third opening for the ground; behind each is a contact. Spades, also referred to as prongs, extending from a plug, conduct power by engaging the contacts. When the receptacle is connected to the line and the circuit is energized, the contacts are live. Safety, energy conservation and clean power (consistent power with low noise) are all concerns today with respect to electrical power. Monitoring power is the solution to all three concerns.

Measuring energy is routinely accomplished by use of power meters and has been enhanced to the benefit of the utility companies by the use of smart metering to measure total power consumption in real time. None of the concerns: safety, energy conservation, or power quality is addressed through smart metering. Energy monitoring systems in the current state-of-the-art make several troubling assumptions. First, the state-of-the-art assumes a site, whether it be residential, commercial or industrial, are wired correctly. Second, state-of-the-art metering systems assume the devices in the network are functioning correctly. And third, state-of-the-art metering systems fail to indicate how much energy is being consumed by a device or whether that device is functioning properly.

Electrical safety is a concern which is not addressed by state-of-the-art metering systems. A common safety concern is electrical shock resulting from insertion of an object into one of the receptacle slots. The art is replete with solutions to the threat of potential electrocution associated with a child inserting a conductive object in the receptacle.

There are multiple solutions in the art consisting of covers and inserts to prevent electrical shock. However these devices may become damaged and worn from the constant insertion and removal, which may also lead to neglecting their use altogether. In addition, small children may also pry off the covers to discover the mystery that lies beneath.

One such solution to this problem is disclosed in U.S. Pat. No. 7,312,394, entitled "Protective device with tamper resistant shutters". The '394 patent discloses a receptacle cover assembly having a shutter. The shutter is movable to an open position by the insertion of at least one plug blade having a predetermined geometry. Although the '394 patent offers a measure of protection, it has no power shut off safety feature, which would prove critical if an object other than a plug blade were able to deceive the device.

To prevent electrical shock in bathrooms, building codes require the use of ground fault interrupt "GFI" receptacles. In principle, these devices operate by measuring the current difference between the hot and neutral lines. If a threshold difference is reached a switch is opened and conduction to the contacts within the receptacle is terminated.

One such device is disclosed in U.S. Pat. No. 7,227,435 entitled "GFCI without bridge contacts and having means for automatically blocking a face opening of a protected receptacle when tripped". The '435 patent discloses a device which prevents insertion of the prongs of a plug when the GFI circuit is tripped in the event of mis-wiring or a switch failure. When the device is tripped, an arm moves downward causing the contact to open and a blocking member is moved to a blocking position. However, a concern with this system is in the event of a failure, the contact will not open, nor will the blocking member be moved into the blocking position.

One solution to the failing GFI switch is disclosed in U.S. Pat. No. 7,317,600 entitled "Circuit interrupting device with automatic end of life test". The '600 patent discloses a GFI circuit capable of simulating a ground fault to determine whether the device is working properly. An integrated circuit chip is connected to switch that interacts with the reset button. A user can determine whether the device has failed by engaging the reset button. However, the user still needs to manually test the device to verify that it is working. Furthermore, the device is normally closed, making the contacts "hot" and hazardous.

Another electrical safety concern is fire resulting from arc faults or appliances malfunctioning. None of the aforementioned solutions address the problem of fire detection, or prevention. One source of fires is an arc fault. An arc fault may be a parallel fault, that is a discharge arcing between the hot line and neutral line, resulting from defects such as lack of insulation between the hot line and neutral line. A series fault is another type of discharge event resulting from defects such as a broken line, loose connection or other single wire failure. A ground arc results from loose grounding straps, shorts to ground and worn insulators. Any of these types of arcs create sufficient heat to cause a fire. A fire can also be caused by a degrading device such as an electric motor overheating. Although many of these causes of fires could be prevented with proper maintenance the defects, are either overlooked or not detected. The ability to measure temperature, detect an arc fault or detect a degrading or failing device would be beneficial.

Another concern today is energy conservation which relates to power consumption. Smart meters utilized by utility companies, although reporting in real time, only provide consumption information for an entire account, and not at the device level. A failing or overloaded device for example may consume more power than it should or more power than it historically has. An example of monitoring energy consumption at the device level is to monitor consumption at a receptacle. One advantage of this is the ability to measure the power being consumed by a failing device. It would be advantageous to provide a system for monitoring energy consumption at a receptacle.

Still another concern is the quality of power in the system. Poor power quality can be traced back to the electrical utility company or by interference from a device. In either case, these power disturbances resulting in poor power quality may cause device failure or damage to sensitive electrical devices.

Thus, it is desirable to provide an intelligent switchable device that can produce a signal indicative of the condition of a branch circuit, monitors and reports power consumption at the receptacle, detects arc faults and electrical problems as well as power disturbances. Additionally, it is also desirable to provide a receptacle that is normally open until a plug is engaged into the load side. Finally, it is also desirous to provide a receptacle that can communicate the device's state to external devices.

SUMMARY

An intelligent switchahle device for selectively conducting electricity comprises a switch for connecting a power line to a load, where the switch has a control input. The intelligent switchable device has at least one sensor for producing a sensor signal indicative of a condition and a transceiver for transmitting data, including communications and receiving data, including remote instructions and rules. Non-volatile memory is adapted for storing (i) a program having instructions and (ii) rules for determining whether to render said switch conductive or non-conductive.

A control circuit is in communication with the transceiver, the sensor and the switch, where the control circuit produces a command signal in response to a sensor signal as determined by the rules. The control circuit has a first mode of operation when the control circuit issues a command signal to render said switch in a conductive state and a second mode of operation when the control circuit issues a command signal to render said switch in a non-conductive state and a third mode of operation where the rules command the switch to be non-conductive.

The intelligent switchable device further comprises a control circuit that comprises a fourth mode of operation where the control circuit issues a command signal to render said switch in a non-conductive state based on a remote command. The device may determine the condition of a power line, such as a branch circuit or the condition of a load.

The transceiver is able to transmit communications indicative of a condition to a remote device, such as a monitor or a server.

A vector network analyzer circuit operatively coupled to said control circuit, wherein said control circuit commands said vector network analyzer circuit to issue a test signal to a branch network.

Further objects, features and advantages of the disclosed embodiments will become apparent to those skilled in the art from analysis of the following written description, the accompanying drawings and the appended claims.

Figure 1:
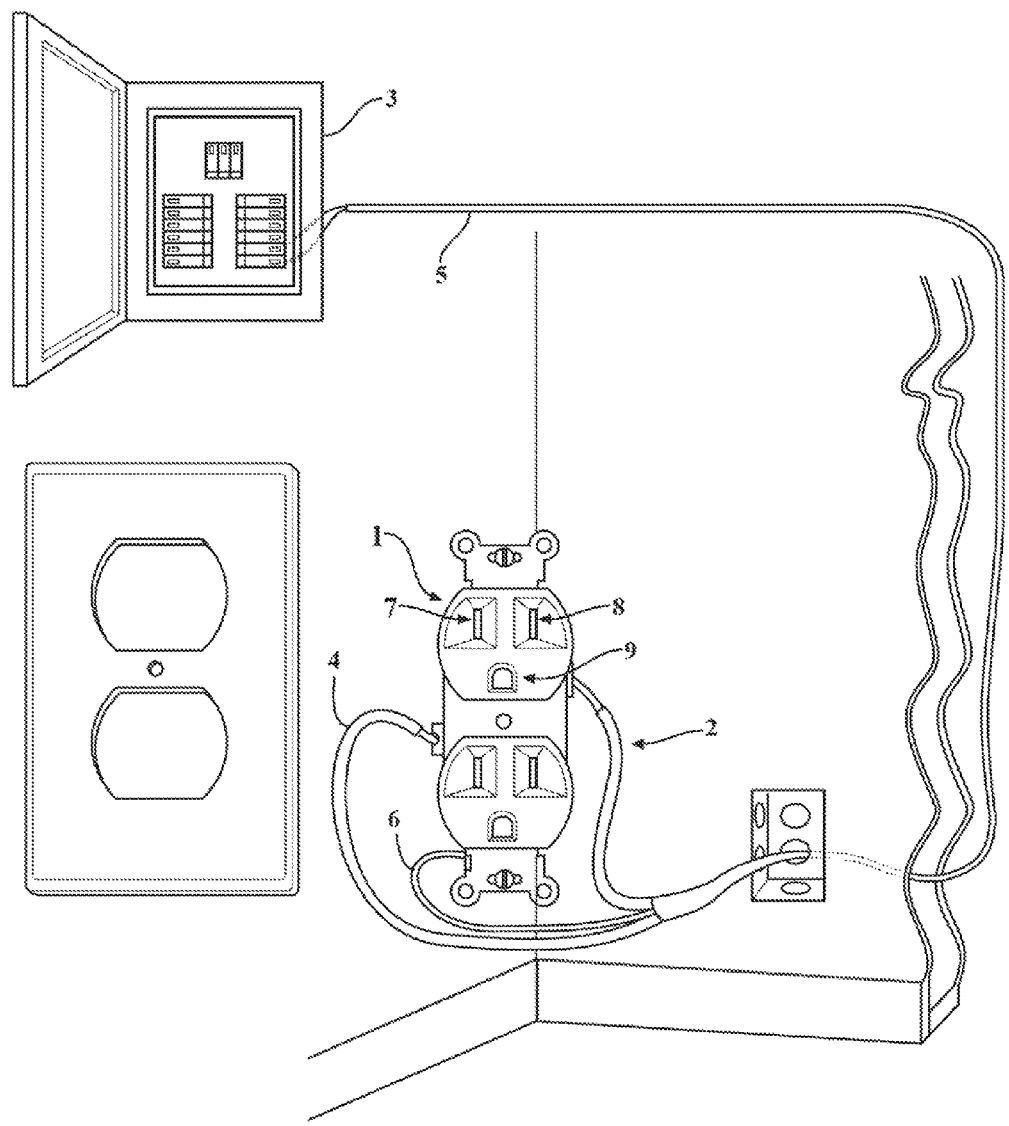
FIG. 1 is a prior art environmental illustration of an electrical receptacle shown connected to a common electrical power line and breaker box with a detail of the wires that comprise a power line.

For the purposes of promoting an understanding of the principles of the embodiments, reference will now be made to the embodiments illustrated in the drawings and specific language will be used to describe the same. It will nevertheless be understood that no limitation of the scope of the embodiments is thereby intended. Any alterations and further modifications in the described, embodiments, and any further applications of the principles of the embodiments as described herein are contemplated as would normally occur to one skilled in the art to which the embodiment relates.

DETAILED DESCRIPTION

Exemplary illustrations of the intelligent switchable device are shown in the attached drawings. A switch for connecting an electrical line to a load is commanded by a control circuit. In one mode rules command the switch to be non-conductive.

In a building that receives electrical power, whether commercial, industrial or residential, the electrical power is distributed into multiple circuits, commonly known as branch circuits, by a master control panel. The master control panel, also known as a breaker box, comprises a case containing circuit breakers for disconnecting branch circuits, including the main which disconnects all service to the branch circuits. Each branch circuit is protected by a circuit breaker. Protection for a branch circuit is governed by the current limit by each circuit breaker. For example, for a branch circuit that is protected by a 20 amp breaker, when 20 amps is exceeded the breaker automatically disconnects, interrupting power to the corresponding branch.

A circuit breaker only monitors one condition-electrical current. There are several other conditions that indicate the health of a branch circuit beyond current. Conditions such as voltage, frequency and temperature may also provide insight into the health of a branch circuit. A circuit breaker has a predefined current limit and remains in a conductive state until the current limit is exceeded. However, there are many other concerns with electrical power that are not detected by a circuit breaker. The state of a branch circuit, such as arcing, incorrect voltage, excessive current draw below the breaker threshold, high temperature, high power consumption, low appliance efficiency and feedback are examples of states of a branch circuit. The present embodiments will now be described with reference to the illustrations.

Referring now to FIG. 1, a prior art environmental illustration of a branch circuit including an electrical receptacle 1, which is shown connected to a common electrical power line 5 and breaker box 3 with a detail of the wires that comprise a power line 5, a hot wire 2, a neutral wire 4 and a ground wire 6. Electrical power line 5 conducts electricity through the branch circuit of FIG. 1.

Figure 2:
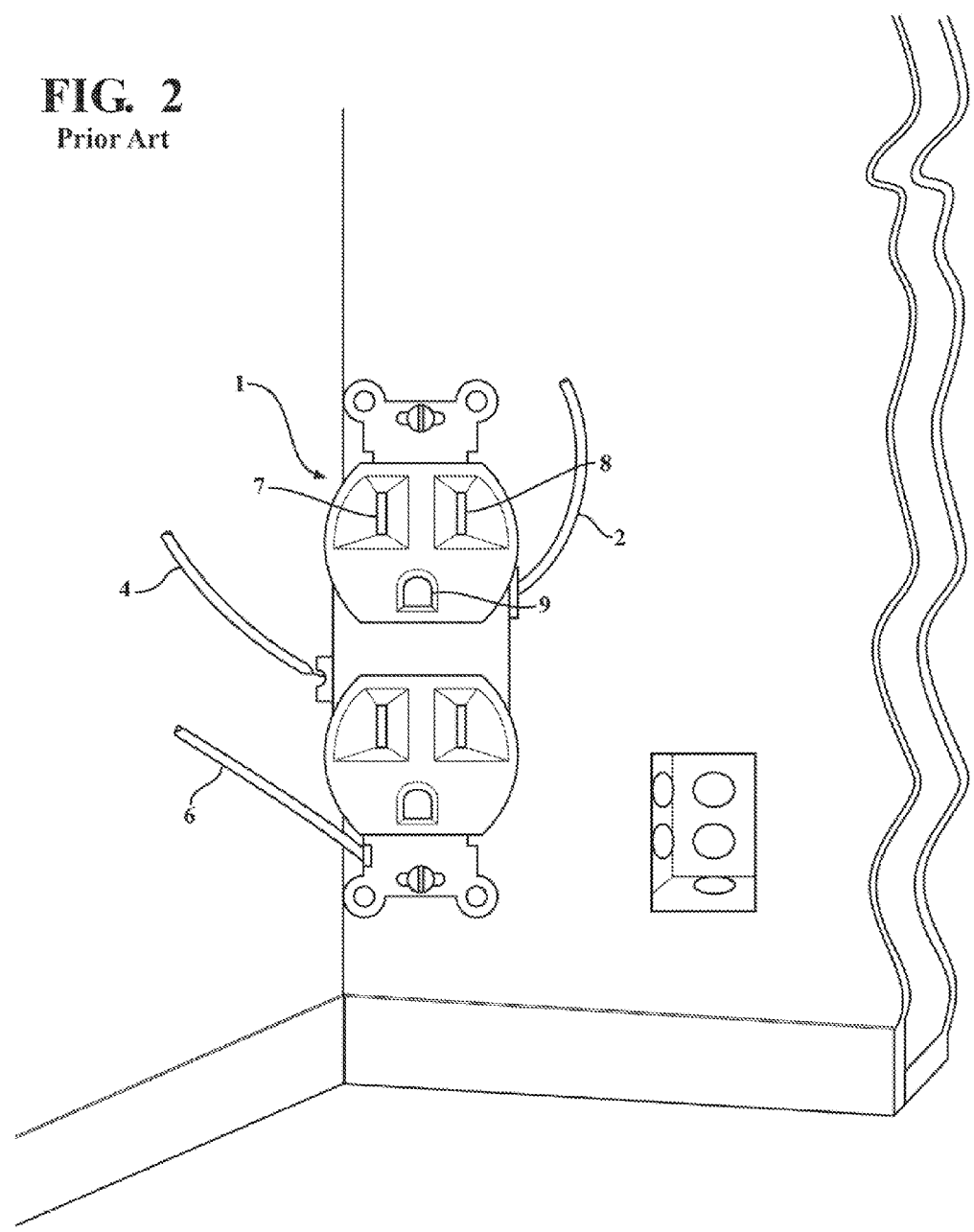
FIG. 2 is a is a prior art environmental illustration of an electrical receptacle shown connected to the wires of a common electrical power line of FIG. 1.

Referring now also to FIG. 2, a prior art environmental illustration of a residential 120 V electrical receptacle 1 is shown connected, to a hot wire 2, a neutral wire 4 and a ground wire 6. The receptacle 1 comprises a neutral aperture 7, a hot aperture 8 and a ground aperture 9. The receptacle 1 typically receives prongs from a power cord of an electrical load (not shown), As used herein "load" shall refer to any electrical device connected to a branch circuit, including residential appliances such as a stove, refrigerator, clothing dryer or personal, computer, commercial devices such as rooftop air-conditioning units and industrial devices such as conveyor systems, welding machines, or robots.

Figure 3A:
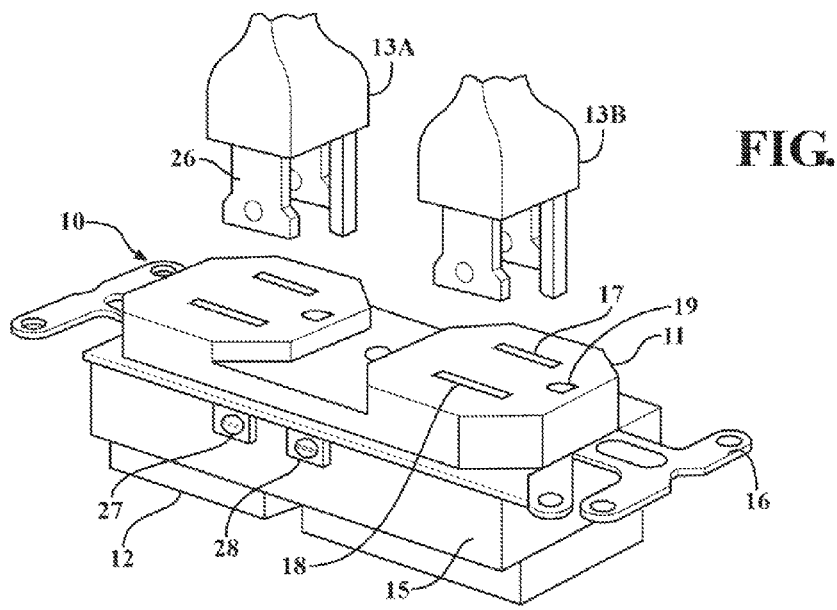
FIG. 3A is a is an exemplary embodiment of a reporting device.

Referring now also to FIG. 3A, an exemplary embodiment of intelligent switchable device 10 is shown in an embodiment for a residential application. It should be noted that although the exemplary embodiment is adapted to a residential 120 V receptacle, this is by no means limiting. Quite the contrary, as an example, the present embodiment may be in a housing within a power cord, such as the transformer box of a laptop power cord. Furthermore, the device 10 may be employed in branch circuits of any voltage or current. For example, the present embodiment may be employed in 120 V, 230 V, 240 V, 400 V and 480 V circuits in frequencies of 50 or 60 Hz and in single or three phase circuits. It should also be understood that the present embodiment may be employed with various connectors, including the various NEMA configurations.

Referring still to FIG. 3A, the device 10 resembles a receptacle 1 and fits within a typical wall box. The device 10 has a load side 11 and a line side 12. A typical powerline 5 connects at the line side 12 of the device 10. The typical residential powerline 5 has a conductor carrying the AC power wave, or hot wire 2, the return line, also known as the neutral wire 4, and a solid copper conductor that is tied to ground, referred to as the ground wire 6. The device 10 is secured to the hot wire 2 at terminal 2.1, the neutral wire at terminal 28 and the grounding wire 6 is secured at ground terminal (not shown) on a ground strap, such as the strap 16.

Figure 3B:
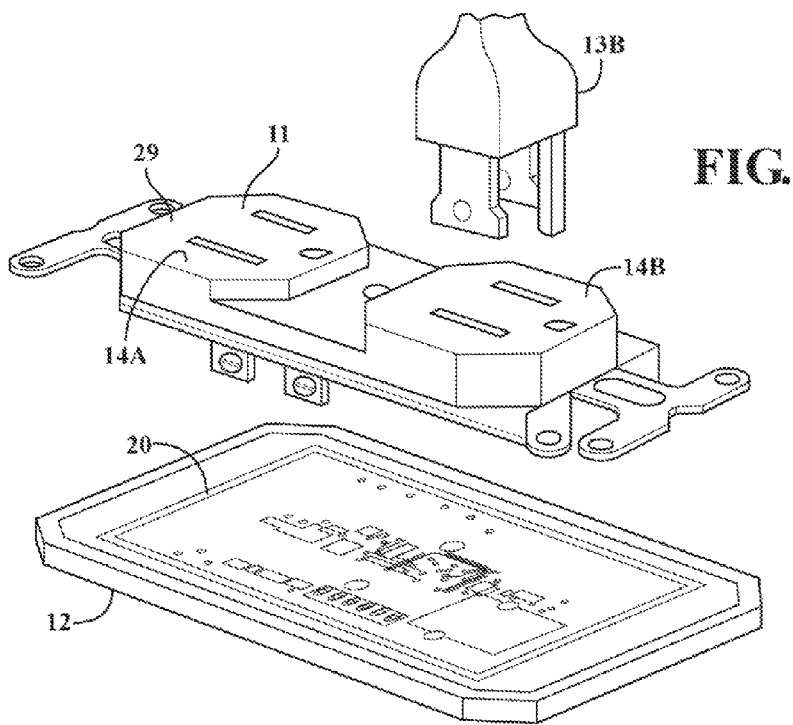
FIG. 3B is a partially exploded view of the reporting device of FIG. 3A, revealing a circuit board.

The device 10 comprises a housing 15 supported by a strap 16. Referring now also to FIG. 3B, a partially exploded view of the reporting device of FIG. 3A is shown revealing a circuit board 20 within the housing 15. On the load side 11 of the reporting device 10 is a face 29 where sockets 14A and 14B are located, each of which having a neutral aperture 17, hot aperture 18 and a ground aperture 19. Sockets 14A and 14B are shown receiving plugs 13A and 13B, respectively. Plugs 13A and 13B have a plurality of prongs 26 extending therefrom. Prongs 26, are also known as pins or spades, which couples the plugs 13A and 13B to sockets 14A and 14B.

Figure 4:
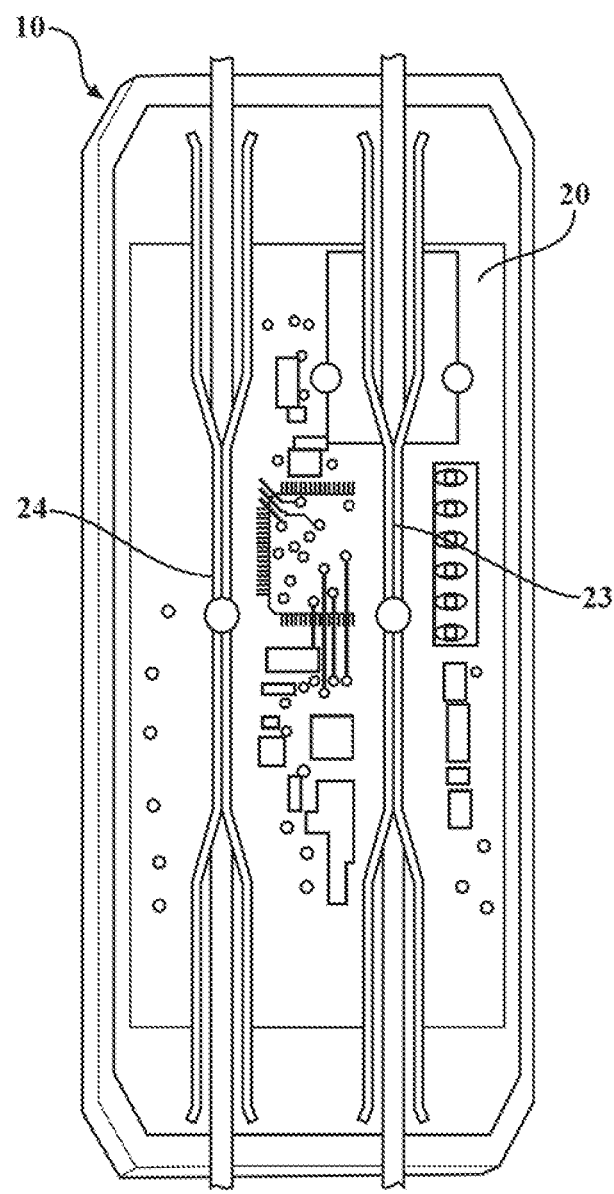
FIG. 4 is a sectional view of the reporting device of FIG. 3B, further revealing protected hot and neutral bus bars.

Referring now also to FIG. 4, a sectional view of the reporting device 10 of FIG. 3B, further revealing a circuit board 20 coupled to protected hot bus bar 23 and protected neutral bus bar 24. Protected hot bus bar 23 and protected neutral bus bar 24 receive the hot and neutral prongs 26 of plugs 13A and 13B. Protected hot bus bar 23 and protected neutral bus bar 24 are "protected" by a protection circuit that will be further illustrated in FIG. 5.

Figure 5:
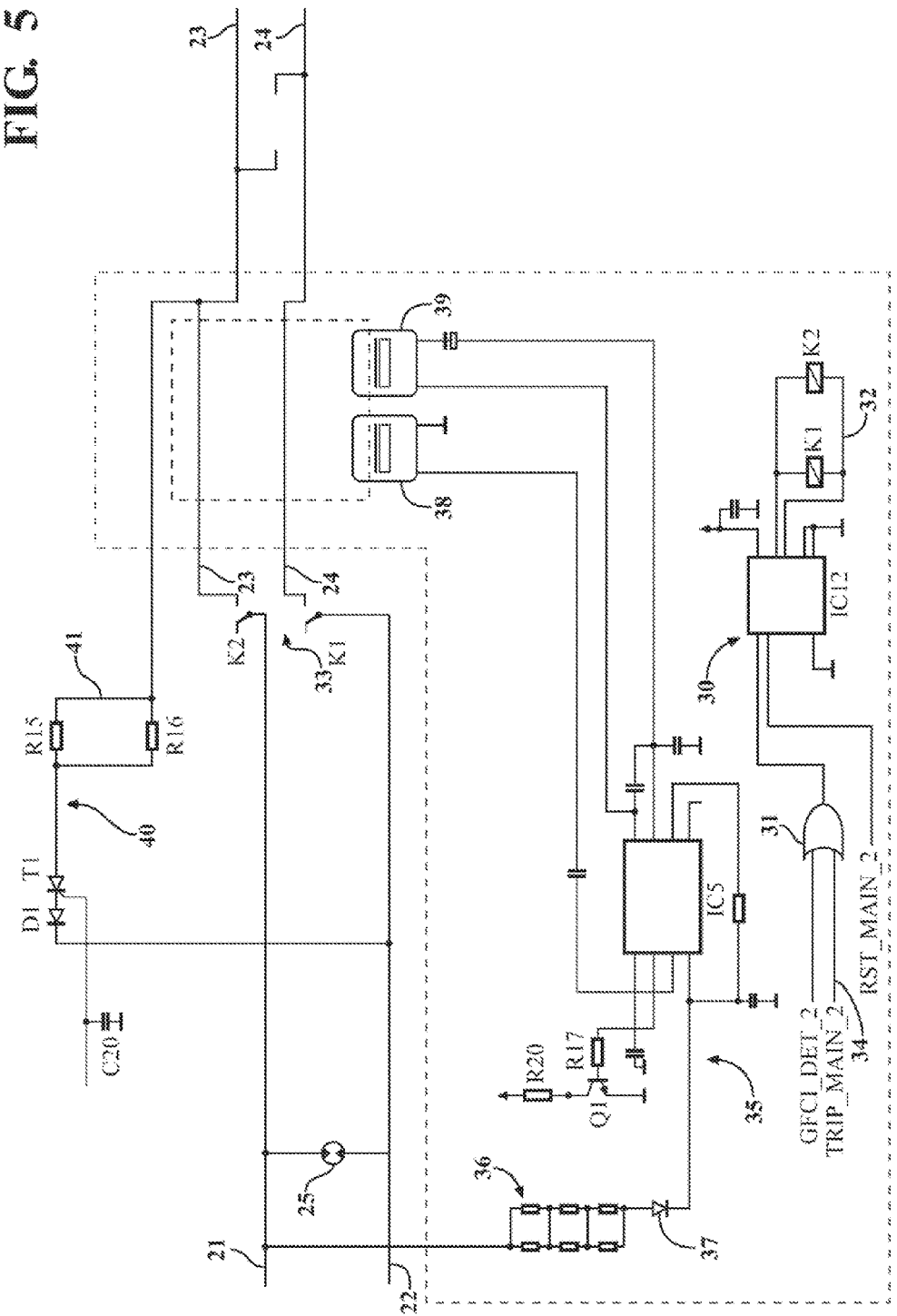
FIG. 5 is a schematic illustration of an exemplary protection circuit, comprising a switch having a control input to render a switch conductive or non-conductive.

Referring now also to FIG. 5, a schematic illustration of an exemplary protection circuit 30 is shown. Unprotected hot bus bar 21 and unprotected neutral bus bar 22 receive power from the power line 5. A surge protector 25, which in the present embodiment is a gas discharge tube, is coupled between unprotected hot bus bar 21 and unprotected neutral bus bar 22. A switch 33, which in the preferred embodiment is a double pole double throw switch, is disposed between unprotected bus bars 21 and 22 and protected bus bars 23 and 24. The switch 33 is triggered by a relay 32 which is commanded by the protection circuit 30. In the preferred embodiment, relay 32 is comprised of latching relays K1 and K2 to command the switch 33 to change poles, or flip the state from conductive to nonconductive or nonconductive to conductive, rather than to continually apply power to the relay 32.

Protection circuit 30 comprises IC12 which receives an input from OR gate 31. The OR gate 31 receives signals GFCI_DET 2 and TRIP_MAIN 2, if either is true IC12 will command relay 32 to open the switch 33. A reset signal RST_MAIN_2 will command relay 32 to close the switch 33. The signals TRIP_MAIN_2 and RST_MAIN_2 are generated by a control circuit 90, described in more detail below. TRIP_MAIN_2 indicates a control circuit decision to open the switch 33 and RST_MAIN_2 indicates a control circuit decision to reset the switch 33.

A GFCI detection circuit 35 includes IC5 and receives signals from a GFCI neutral sensor 38 and GFCI hot sensor 39 to determine if a ground fault has occurred. In the preferred embodiment sensors 38 and 39 are hall effect sensors. Power for IC5 is provided by the power taken from the unprotected hot bus bar 21 which passes through the resistor network 36 and protective diode 37. When a ground fault is detected a SCR_TRIG signal from IC5 is fed to NPN transistor Q1 which triggers the GFCI_DET_2 signal. Defection signal from detection circuit 35 is fed to an OR gate 31 and then to IC12 to trigger the relays 32. A GFCI test circuit 40 is provided consisting of a resistor network 41 and SCR TI and diode D1.

In operation the switch 33 is commanded by control input 34 to render the switch 33 conductive or non-conductive. Assuming the switch 33 is initially in a conductive state, either TRIP_MAIN_2 generated by the control circuit 90 or GFCI_DET_2 from the detection circuit 35 will trigger the protection circuit 30 to cause the relay 32, which in the preferred embodiment are of latching relays K1 and K2, to command the switch 33 to change the state from conductive to nonconductive.

Figure 6:
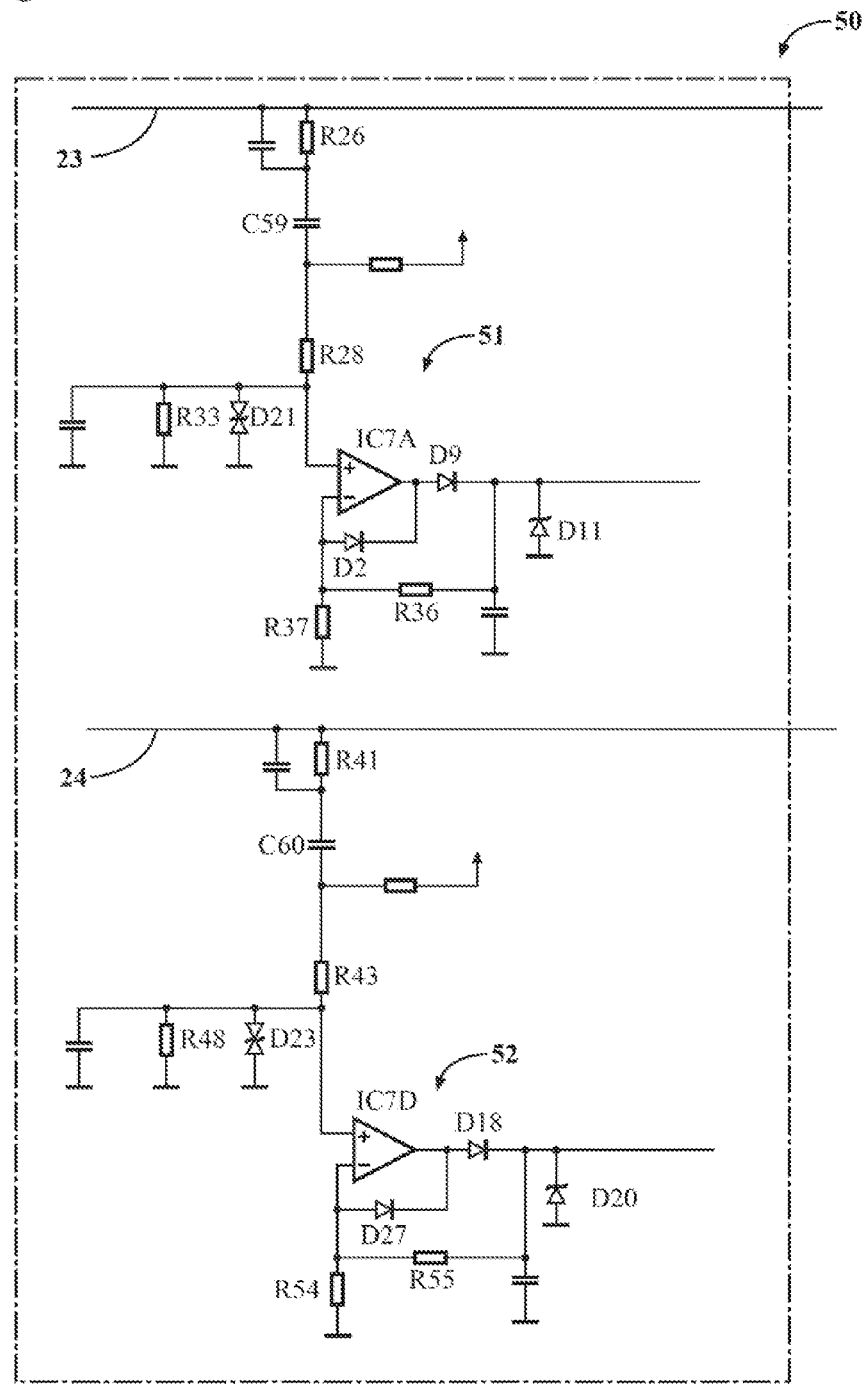
FIG. 6 is a schematic illustration of exemplary temperature measurement module for detecting temperature of each of a hot and neutral bus line.

Referring now also to FIG. 6, a schematic illustration of exemplary temperature measurement module 50 for detecting temperature of each of a protected hot bus bar 23 and protected neutral bus bar 24 is shown. Sensor 51 measures the temperature of the protected hot bus bar 23 while sensor 52 measures the temperature of the protected neutral bus bar 24. Temperature sensor 51 comprises the resistor network thermistors R26, resistor R28 and resistor R33 and op amp IC7A. Temperature sensor 52 comprises the resistor network thermistors R41, resistor r43 and resistor R48 and op amp IC7D. Although the particular embodiment of temperature sensors 51 and 52 has been provided for exemplary purposes, those skilled in the art will immediately recognize that any suitable temperature sensor known in the art may be substituted for temperature sensors 51 and 52. Thermistors R26, R41 are coupled to the protected hot bus bar 23 and protected neutral bus bar 24 respectively. Thermistors R26, R41 are NTC type thermistors and in the event of a temperature increase to the bus bars 23, 24 as a result of high current or otherwise, the temperature of the thermistors R26, R41 will increase, thereby lowering the resistance of thermistors R26, R41. Capacitors C59 and C60 provides a DC bias, blocking DC current to the sensors 51, 52. IC7A and IC7D are non-inverting AC coupled amplifiers coupled to rectifying diodes D2 and D9 respectively. D11 and D20 are Zener diodes providing over voltage protection. Resistors R28 and R43 take the voltage down to a safe level for the op amps IC7A and IC7D. D21 and D23 are bi-directional transient voltage diodes and provide over voltage protection. The change in resistance to thermistors R26, R41 causes the voltage divider networks (R26, R28, R33) and (R41, R43, R48) to change the voltage provided to the op amps IC7A and IC7D which is amplified and provided to the control circuit 90 as signal H_TEMP_3 and N_TEMP_3. The sensors 51, 52 respond to the temperature of the bus bars 23, 24 by sending a sensor signal indicative of a temperature to the control circuit 90.

Figure 7:
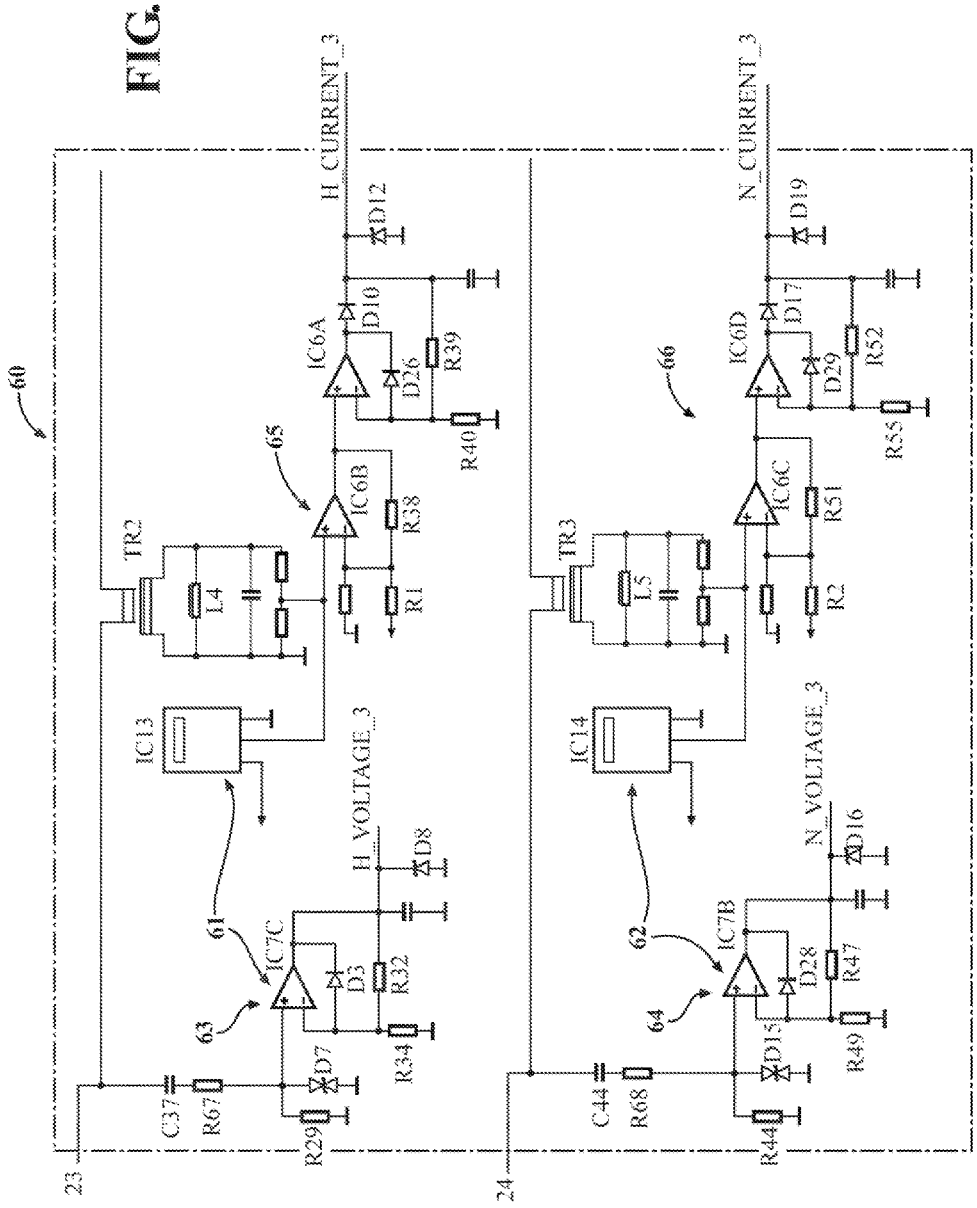
FIG. 7 is a schematic illustration of exemplary power measurement module for sensing power and current for each of a hot and neutral line.

Referring now also to FIG. 7, a schematic illustration of an exemplary power measurement module 60 for sensing power and current for each of a protected hot bus bar 23 and protected neutral bus bar 24 is shown. Sensor 61 measures the power of the protected hot bus bar 23 while sensor 62 measures the power of the protected neutral bus bar 24. The power sensors 61, 62, each include a voltage measurement circuit 63, 64, and a current measurement circuit 65, 66, respectively.

Figure 8A:
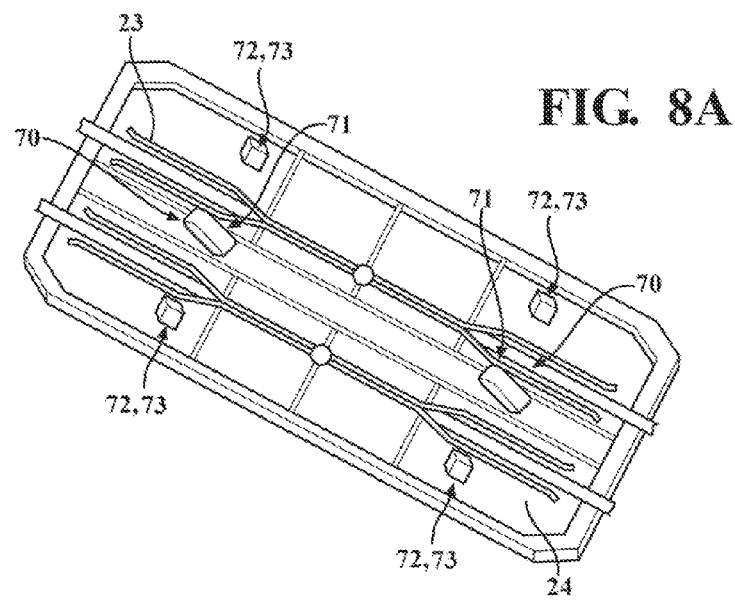
FIG. 8A is a sectional view of the reporting device of FIG. 3B, revealing an embodiment of a prong detector.

Referring now also to FIG. 8A a sectional view of the device 10 of FIG. 4 is shown, revealing a prong detector 70. Protected hot has bar 23 and protected neutral bus bar 24 are disposed within the device 10. Each of the protected hot bus bar 23 and protected neutral bus bar 24 are disposed adjacent to each of the apertures 17, 18. Specifically, the protected neutral bus bar 24 is disposed adjacent to the neutral aperture 17 and protected hot bus bar 23 is disposed adjacent to the hot aperture 18 to permit conduction with a user engageable contact, such as the prong 26 of a plug 13A, when inserted into one of the apertures 17, 18. For example, when the prongs 26 of plug 13A are inserted into apertures 17, 18, 19 the conductive material of the prongs 26 permit conduction with the hot and neutral contacts 23, 24 (the ground contact is not shown).

The prong detector 70 is disposed in the device 10 and includes of an emitter 71 and detectors 72, 73. Each of the detectors 72, 73 emit a first signal to indicate the absence an engageable contact in one of the apertures 17, 18 and a second signal, distinguishable from the first signal, to indicate the presence of an engageable contact in apertures 17, 18.

Figure 8B:
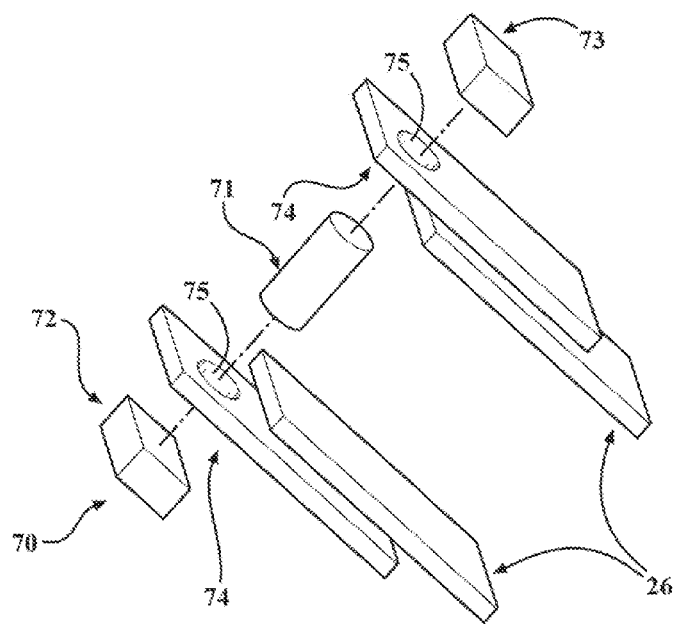
FIG. 8B is a diagram of one embodiment of a prong detector.

Referring now also to FIG. 8B, a diagram of one embodiment of a prong detector is shown, revealing the operative elements therein. In the preferred embodiment, the emitter 71 produces light and the detectors 72, 73 produces a signal indicative of the level of light detected. Partitions 24 are provided to minimise the interference of ambient light on the detectors 22, 23. The partitions 74 each have an aperture 75 disposed therein to permit light from the emitter 71 to reach the detectors 72, 73. Each of the prongs 26 when properly inserted will interfere with light from the emitter 71, causing a "no light" or "low light" signal from the detectors 72, 73. Therefore if both detector 72 and detector 73 indicate a low light signal, a plug is presumed to be coupled to device 10. As such when the emitter 71, detectors 72, 73 and partitions 74 with apertures 75 are positioned properly, the presence or absence of the user engageable contact such as prongs 26 may be detected.

Although residential applications have been referenced herein those skilled in the art will immediately recognize that the application of the presence embodiment may be employed beyond residential and specifically may also employed in commercial and/or industrial applications. Additionally, even though light emitting and detecting methods are specifically disclosed herein, it is intended to be within the scope of the present embodiment that other means of detecting the presence of plug blades be substituted for the light emitting and detecting methodologies disclosed herein.

Figure 8C:
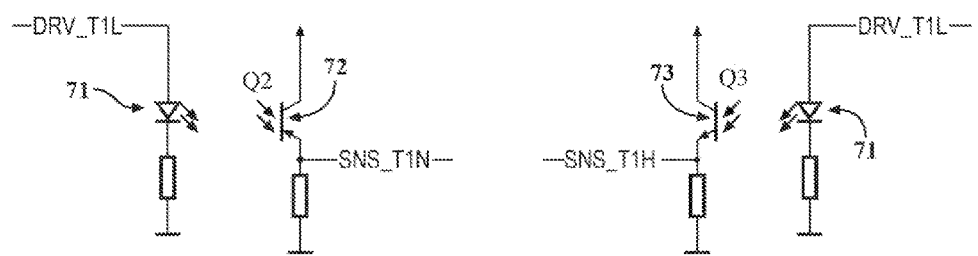
FIG. 8C is a schematic representation of a pair of prong detectors of FIG. 8B, revealing the operative elements therein.

Referring now to FIG. 8C, a schematic representation of a pair of prong detectors of FIG. 8B, revealing the operative elements therein is shown. In the present embodiment, the emitter 71 is a light emitting diode, or "LED." For example, it maybe of the type such as a GaAs infrared emitter. The detector 12 is an infrared phototransistor, which, as more light strikes the phototransistor, the higher the current flowing through the collector emitter leads causing a "high light" signal from the detectors 72, 73. The circuits in FIG. 8C act like a voltage divider. The variable current through the resistor causes a voltage drop.

Figure 8D:
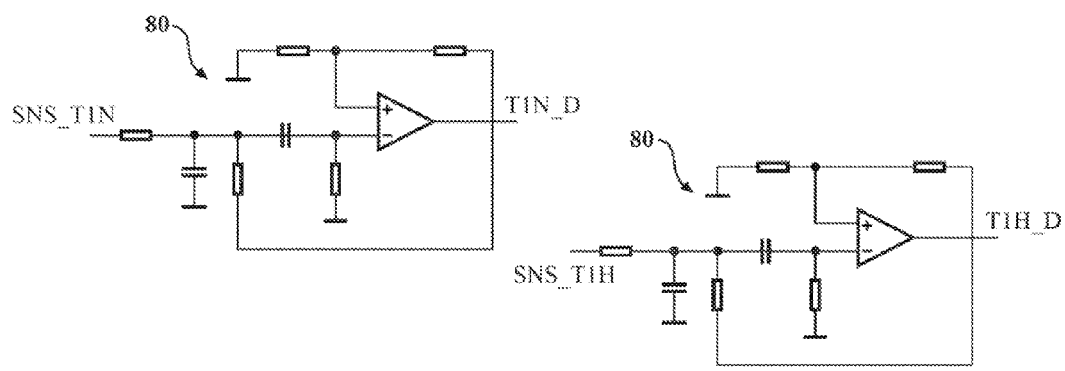
FIG. 8D is a schematic representation of a pair of filters for filtering out ambient light from the detectors of FIG. 8C.

As a precautionary measure, in the preferred embodiment, the LED is modulated at about 100 kHz to produce a target frequency and then provided to a filtering circuit 80 as shown in FIG. 8D. In the environment such as a wall box environment the optical signal detection reliability required of an electrical socket due to dust and debris that would impair detection of light from the emitter 71 and the device 10 is intended to function without maintenance. The device 10 is capable of discriminating between electro-optical emitters 71 and variable ambient lighting conditions. Ambient optical power leaking to the detector 72, 73 from various sources such as lamps and sunlight, and changes in emitter optical power due to aging are obviated by the frequency modulation detection scheme of the present sub-system of the present embodiment. Practical light sources change optical emissivity due to a number of causes over time. The frequency based approach found herein allows for compensation for the changes in optical emissivity and discrimination of sources. Only light at the modulated frequency would signal the interrupter circuit of the present embodiment.

Referring now also to FIG. 8D, a schematic representation of a pair of filters for filtering out ambient light from the detectors of FIG. 8C is shown. The signal that leaves the branch of FIG. 8C as 5NS_TIN enters the bandpass filtering circuit 80. The bandpass filter assists in eliminating erroneous signals that could be generated from ambient light by filtering the incoming voltage and therefore only signals energized by the LED which is modulated at about 100 kHz may pass. The output signal of the filtering circuit 80 TIN_D is then provided to a microcontroller 90 described in FIG 9 as IC3.

Figure 9:
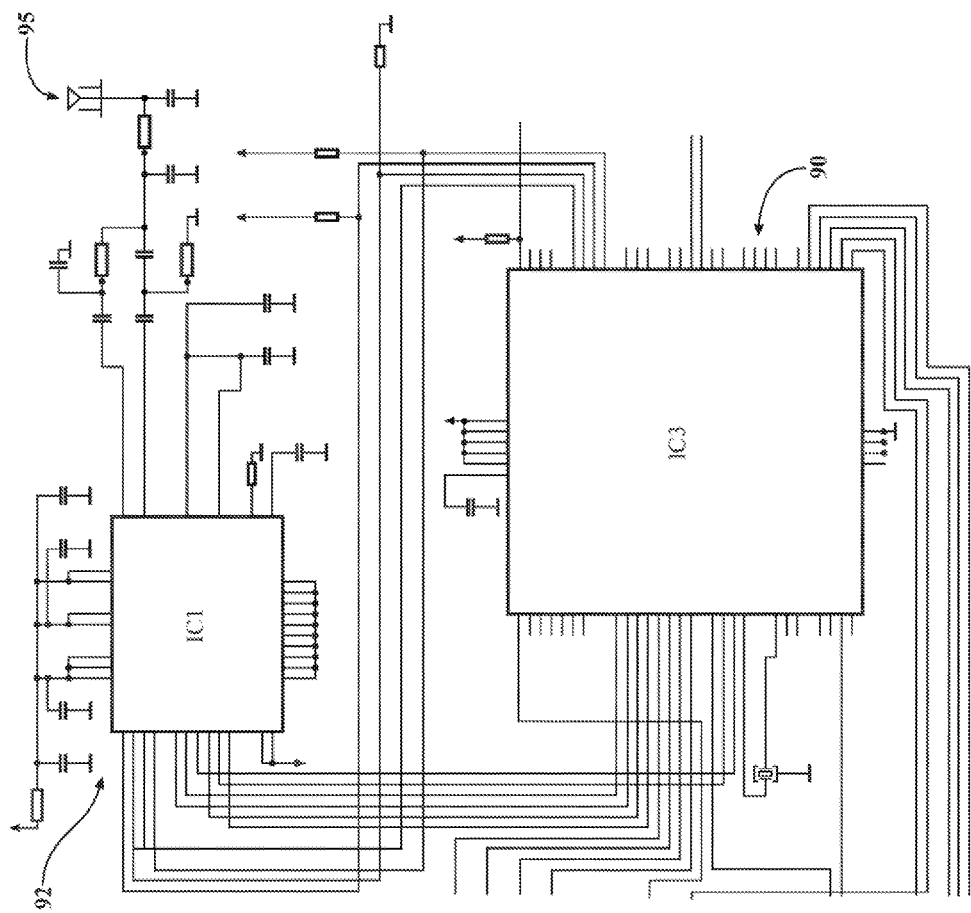
FIG. 9 is a schematic illustration of a microcontroller.

Referring now to FIG. 9, a schematic illustration of a microcontroller 90 employed in one embodiment of the device 10 is shown. The microcontroller 90 is a programmable logic device, and as such, any suitable programmable device may be substituted for the microcontroller 90 employed in the present embodiment. In the preferred embodiment, microcontroller 90 has a microprocessor, volatile memory and non-volatile memory. Microcontroller 90, also identified as IC3, receives signals produced by the detectors 72, 73. The non-volatile memory is able to store instructions and rules. In addition, the non-volatile memory is able to receive instructions and rules remotely through a transceiver 95.

The microcontroller 90 has instructions to produce a third signal indicative of the presence of two or more engageable contacts 26 in the device 10 and a fourth signal, distinguishable from the third signal, to indicate the presence of less than two engageable contacts 26 in the device 10. The microcontroller 90 transmits one of the third signal or fourth signal to interrupter circuit to cause a switch to open or close. Additionally, microcontroller 90 receives signals from a number of other sensors, including a thermal sensor, current sensor, and a voltage sensor to indicate a condition of a branch circuit.

In addition, microcontroller 90 is programmed to command the device 10 to not conduct electricity if the rules determine that the switch 33 to be non-conductive. As used herein, rules refer to what operation to perform based on one or more conditions, measurements, or facts, or any combination thereof. An example of a fact is a particular model of a load connected to a branch circuit. An example of a measurement is measured current. An example of a condition is overheating based on a temperature measurement. As more knowledge is learned, the rules may be updated in the device 10.

The microcontroller 90 has a first mode of operation when the microcontroller 90 issues a command signal to render the switch 33 to be in a conductive state and a second mode of operation when the microcontroller 90 issues a command signal to render the switch 33 to be in a non-conductive state. A third mode of operation exists where the rules command the switch 33 to be non-conductive. A fourth mode of operation where the microcontroller 90 issues a command signal to render said switch 33 in a non-conductive state based on a command received remotely.

The output of microcontroller SO is operatively coupled to number of communication devices located within the device 10, including warning lights and audible alarms. Microcontroller 90 also communicates through other communication conduits, for example, microcontroller 90 is shown coupled to a serial port, identified as IC9. Additionally microcontroller 90 may communicate through the powerline or wirelessly, for example the use of a transceiver 95. The ability to communicate externally provides the device 10 with the ability to transfer data about the state of the circuit for storage on location or off-site. This enables the device 10 to report faults in real-time or to demonstrate gradual deterioration of a condition, such as high current or heat, over time. Such information could be crucial in determining the cause of a fire, for example.

Microcontroller 90 is programmed to command the device 10 to not conduct electricity unless the microcontroller 90 determines that a plug 8 is engaged with device 10 and not merely some other object inserted into one of the apertures 13, 14. This is achieved by determining the presence of two of two blades 9 inserted into the apertures 13, 14 by the detectors 22, 23. Accordingly, the normal state of reciprocal 10 is that no power is conducted to contacts 15, 16 unless a plug 13A is determined to be connected to the device 10.

The output signals from the microcontroller 90, based on signals from detectors 22, 23, govern the conductive state of the device 10. Referring now also to FIG. 5A, a schematic illustration of an interrupter circuit 50 is shown. The interrupter circuit 50 has a line side, a load side and a switch. The line side is operatively coupled to a source of electrical power, for example a 14-2 wire. The load side is operatively coupled to the conductor contracts 15, 16. A switch is coupled between the line side and the load side to govern the flow of electrical power to the conductor contacts 15, 16 based on the signals from the detectors 22, 23.

The interrupter circuit 50 governs the flow of electrical power to the conductor contacts 15, 16 based on the signals received from the detectors 22, 23. The circuit 50 comprises a switch employing four silicon controlled rectifiers T1-T4 to open or close the AC power wave. Each SCR is provided to conduct or not conduct a half wave coming into the device 10 through terminal 1 or 3. Ideally only two SCRs should be necessary, however in the event of miss wiring the hot and neutral lines two SCRs are provided on the neutral line as a safety precaution. The signals from PH_A and PH_B are provided to the gate of the SCRs. When PH_A and PH_B provide voltage sufficient to conduct across the SCRs, the interrupter circuit 50 is conductive. Note that T1 and T2 are in parallel, but flipped. This is because the SCRs only work in one direction. A diode bridge B2 is provided to rectify AC power to DC. Additionally, GFI protection is provided at TR6 and TR5. FIG. 5B is an alternate embodiment of the interrupter circuit of FIG. 5A, further comprising a power transformer TR3 in front of the bridge diode of the power supply.

Figure 10:
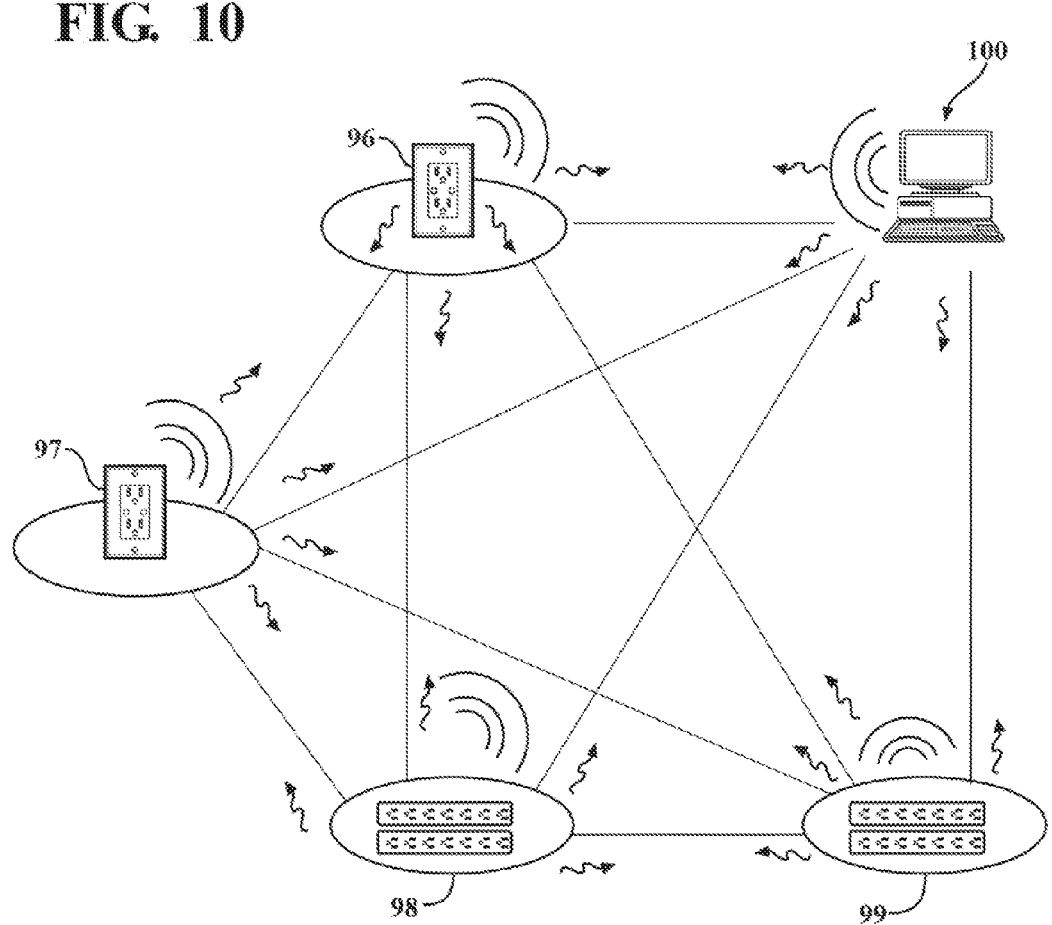
FIG. 10 is a schematic illustration of multiple reporting devices in communication with a monitoring device.

Referring now also to FIG. 10, is a schematic illustration of multiple devices 96-99 use an RF Mesh topology to communicate with a monitor 100. Devices 96-99 use a 2.4 GHz wireless mesh network, which in the preferred embodiment is the ZigBee standard for communicating among the devices 96-99 and the devices 96-99 and a monitor 100. As set forth above, the device 10 may take several forms, for example, power strips 98, 99 and receptacles 96, 97.

In operation, the device 10 of the present embodiment is able to monitor multiple conditions, such as current, temperature, power, and change in VKN and conduct multiple tests. Once installed, the device 10 will have a unique identifier and then will conduct a baseline reading of the branch circuit that the device 10 governs. As set forth more fully below, the device 10 extracts phase shift information about a circuit from the reflection signal, characterizing and reporting a unitless but repeatable and predictable value, referred, to herein as the Vasqaez Kuttner Number ("VKN"). As used herein, "reflection" is understood to mean the response monitored on the same branch circuit through which the test signal was transmitted. This technique becomes a signature of the circuit under test and forwards the information to the server 200 through a monitor 100.

The device 10 can be used for monitoring the branch circuit by automated repeated testing in order to detect changes indicative of faults, wiretaps, or the presence of unauthorized equipment. Additionally, the history of the condition, of a branch, circuit may be recorded.

The device 10 can create and store a generated VKN. The device 10 uses a vector network analyzer scheme that measures a reflection from an injected signal comprising a range of amplitudes and phases. The VKN is a unique number that is measured from the reflection, and once stored in the database 200, becomes categorized as a representative signature to the configuration of the branch circuit under test and assigned to the device 10. Typical network analyzers generate large amounts of data. The VKN is a succinct result that conveys the difference between a baseline reading and a possibly compromised circuit reading. The power conditioned apparatus measures the attenuation effects of branch circuits, then calculates the measured value.

The VKN is a unitless number that, once generated, becomes a representative signature of the configuration of the circuit under test. Since frequency pulses are attenuated by junctions, impedance, capacitance and other electrical/electronic devices in the circuit, each unique circuit configuration will attenuate one or more frequencies in a unique way. If ultimately plotted on a graph, the individual values that make up the VKN can be used to create a "fingerprint" of the circuit. Because two identical circuits would have the same measured values for all frequency pulses, identical circuits will cause the apparatus to generate the same VKN as well as the same "fingerprint" for both circuits.

Figure 11:
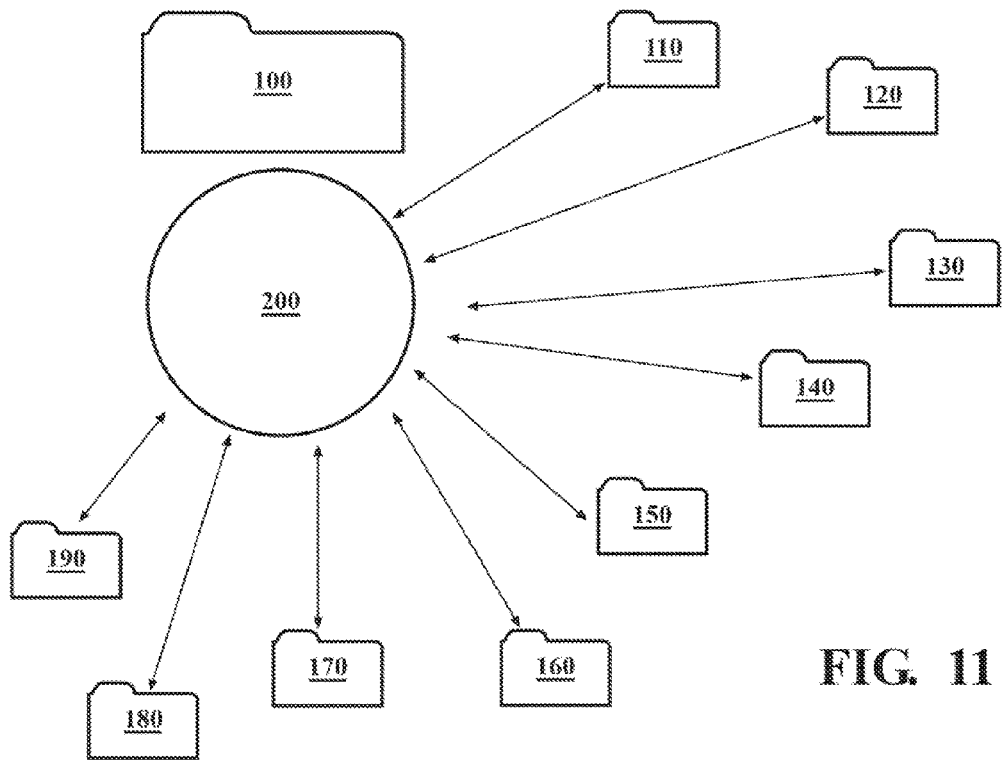
FIG. 11 is a schematic illustration of multiple monitors in communication with a server.

Referring now to FIG. 11, a schematic illustration of multiple monitors 100-190 is shown in communication with a server 200. One or more monitors 100-190 are assigned to a single customer or location.

Figure 12:
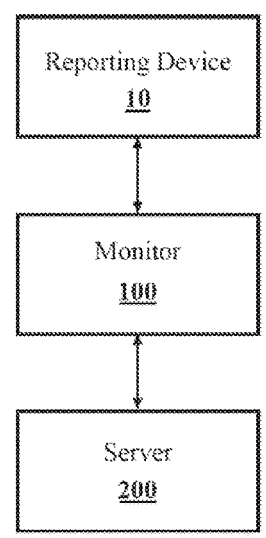
FIG. 12 is an exemplary data flow chart.

Referring now to FIG. 12, an exemplary data flow chart is shown. Information flows from the intelligent switchable device 10, also known as a reporting device 10, to a monitor 100, and from the monitor 100 to a server 200.

Figure 13:
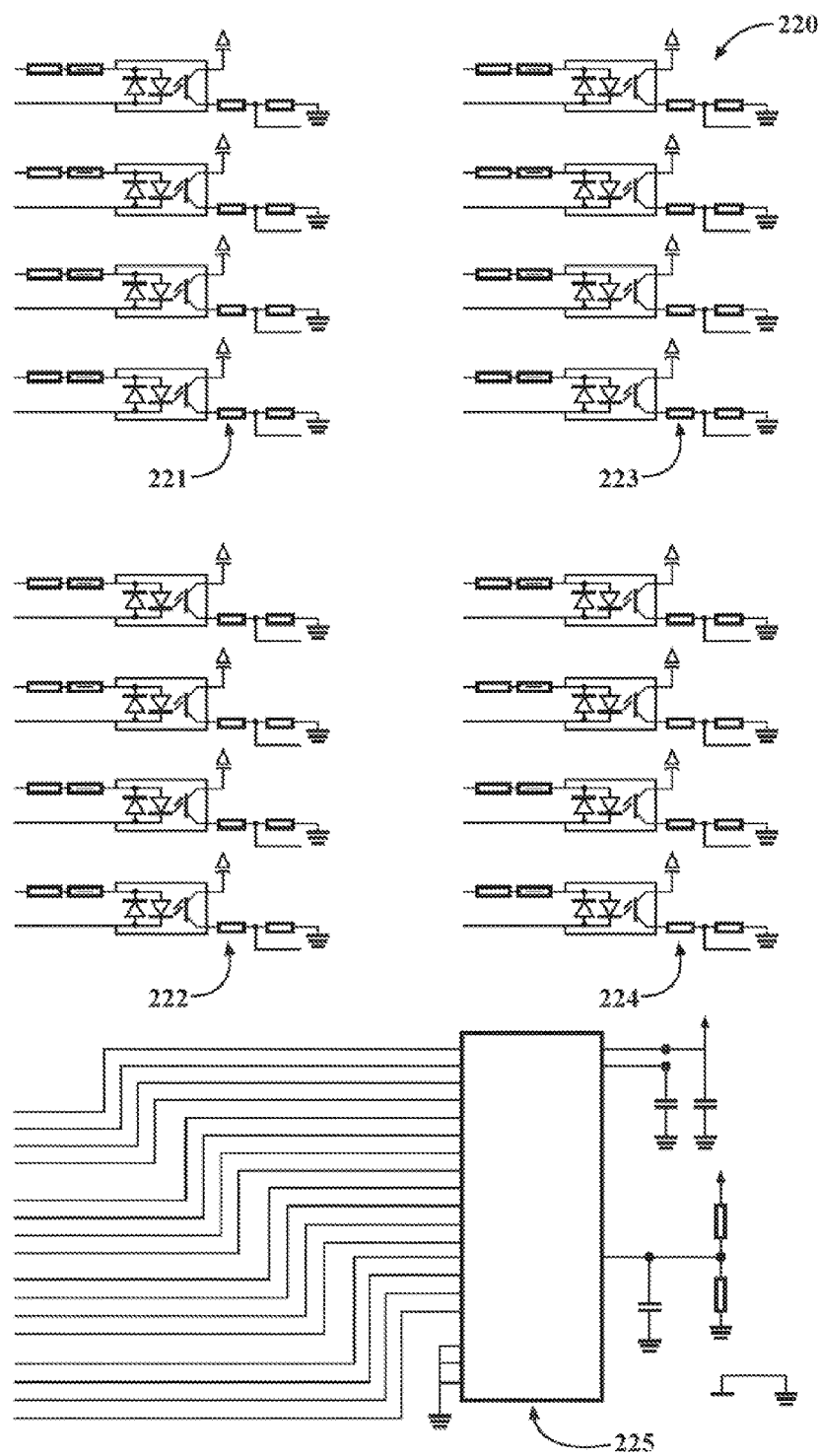
FIG. 13 is an embodiment of a line monitoring circuit for determining whether the line is in use.

Referring now to FIG. 13, a branch circuit monitoring circuit 220 for determining whether the branch circuit is in use is shown. The branch circuit monitoring circuit 220 includes a plurality of arrays 221, 222, 223, 224 for testing a branch circuit condition are interconnected to the device 10. Each of the arrays 221-224 are electrically isolated from the lines 5, and each of the arrays 221-224 are preferably an optoisolator array.

Once the branch circuit state is known, the device 10 can be commanded to execute one of several test types. The device 10 can determine if a branch circuit is energized and immediately abort a test in progress if necessary. Alternatively, if a test is scheduled, the test can be suspended until the branch circuit is available if the test type would interfere with usage. Furthermore, a test type can be executed that does not interfere with the power usage and does not require the line to be dry (not in use) to execute the test. Finally, the server 200 may command the test to be executed during nonpeak hours.

Figure 14:
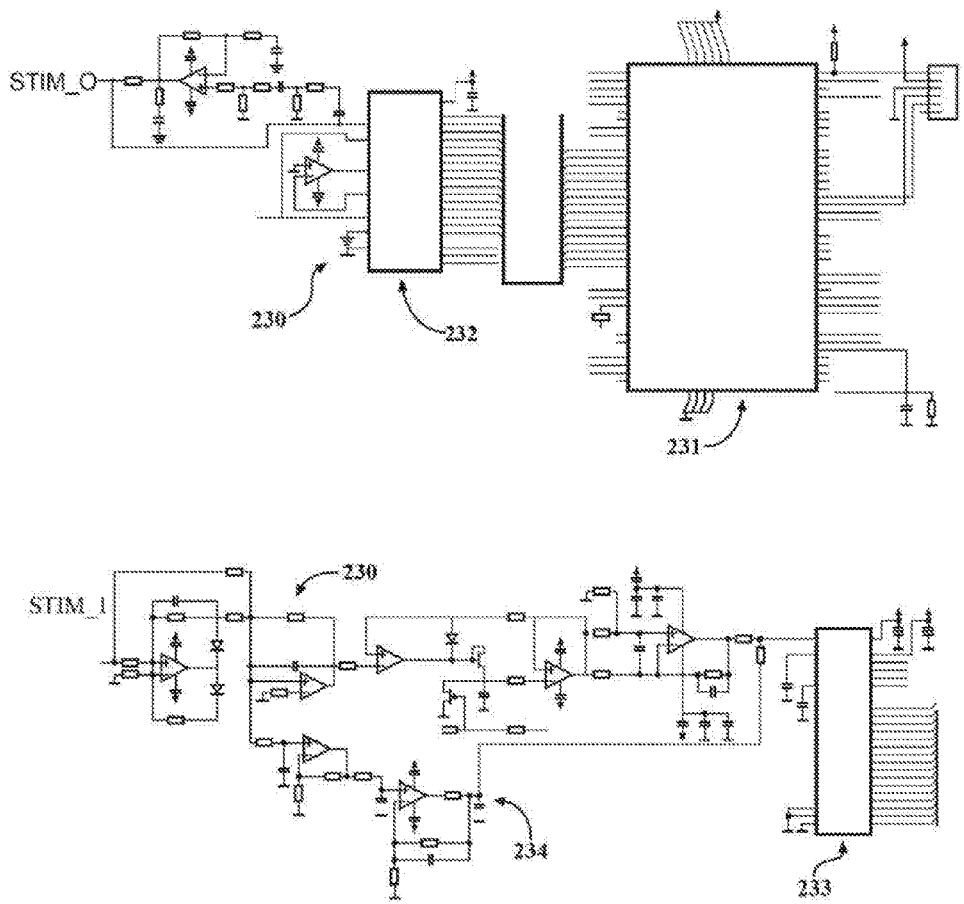
FIG. 14 is a test generation circuit producing a test signal to be injected into a line and issuing test commands.

Referring now to FIG. 14, a test generation circuit 230 having a controller 231 is shown. The controller 231 has a CPU (not shown) and memory storage (not shown) adapted to receive signals and transmit instructions. The controller 231 receives the digital signal indicative of branch circuit state for each branch circuit from the A/D 225, and, based on the state of each branch circuit, produces instructions to further evaluate the branch circuit, as discussed further below. The controller 231 produces a digital signal to command a digital to analog converter "DAC" 232 to produce an analog signal, identified as STIM_O, to be injected into the line 5.

In the preferred embodiment, the instructions executed by the controller 231 includes instructions to transmit a test signal to at least one user selectable branch circuit, compare a test signal response measured from at least one user selectable branch circuit to a baseline response, report a change in branch circuit state when the difference between a test signal response and a baseline signal response exceeds a threshold, and issue a counter-measure based upon countermeasure settings.

Referring still to FIG. 14, in the preferred embodiment, a power amplifier (not shown) provides additional drive capability to the test signal as generated by the test generation circuit 230. The controller 231 is capable of commanding any desired wave form, including a square wave, sinusoidal, triangular, or the like. The controller 231 is programmable to output a user specified test signal, however, it is the intent of the present embodiment to provide a test signal having a frequency above 50 KHz. In one embodiment, the test signal, STIM_O, is a single frequency sine wave having a frequency above 50 KHz.

The test generation circuit 230 forms part of a stimulus response module which is user-configured. A user may select a test with an option to select a test compatible with an IN-USE state (Type 3) since a Type 1 or Type 2 test would not generally be available. However, the system may be configured disconnect the branch circuit under certain conditions, as set forth in more detail below, Controller 231 is programmed to issue test commands to carry out desired tests. In the preferred embodiment, STIM_O is a sine wave having a frequency above 50 KHz. The commands will include a direction to disconnect the branch circuit and to test the branch circuit. If the line monitoring circuit 220 delivers a NOT-IN-USE state, the controller 231 will issue the test command.

Figure 15:
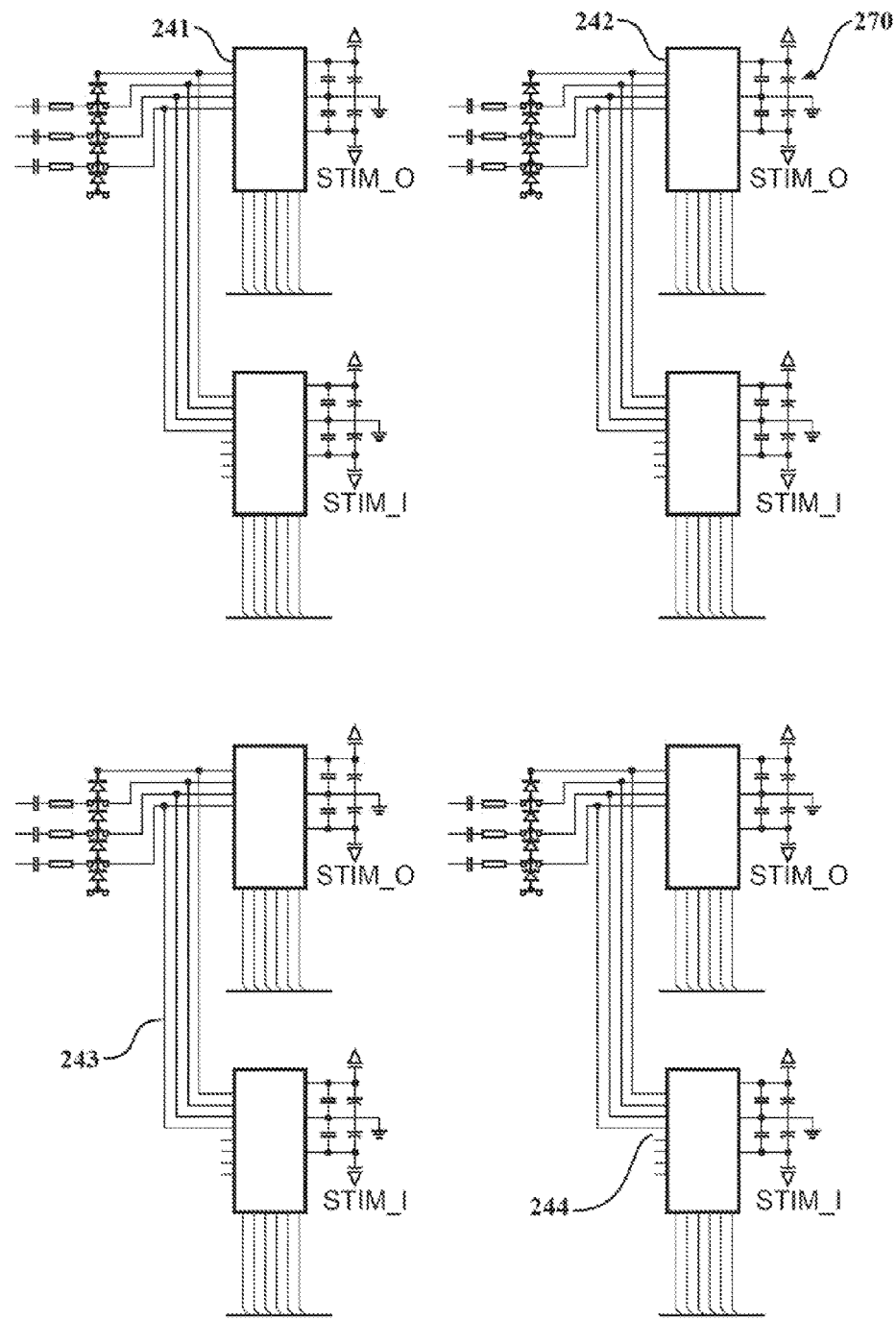
FIG. 15 is a test switch circuit for directing a test and a response signal to a desired line.

As shown in FIG. 15, the test command is transmitted to a test switch circuit 240, having a plurality of switches 241, 242, 243, 244, collectively referred to as a switch matrix, for sending and receiving test signals. The test switch circuit 240 directs a test signal input and output to a desired branch circuit on the test commands received. A control bus and integrated circuit control the switches 241-244. Each of the switches directs a test signal to and from the branch circuit based on the test commands.

The STIM_O signal is directed out by switches 241-244. Once STIM_O is injected into a branch circuit, the response signal STIM_I is monitored on the designated branch circuit by selection of one of the lines on one of the switches 241-244. Accordingly, switches 241-244 direct the STIM_O signal out by, and select the line and wire to monitor, for either the reflection or transmission. For example, a test on a branch circuit will direct the STIM_O signal. Switch 243 directs the response of the test signal found on the branch circuit and identifies the signal as STIM_I.

Figure 16:
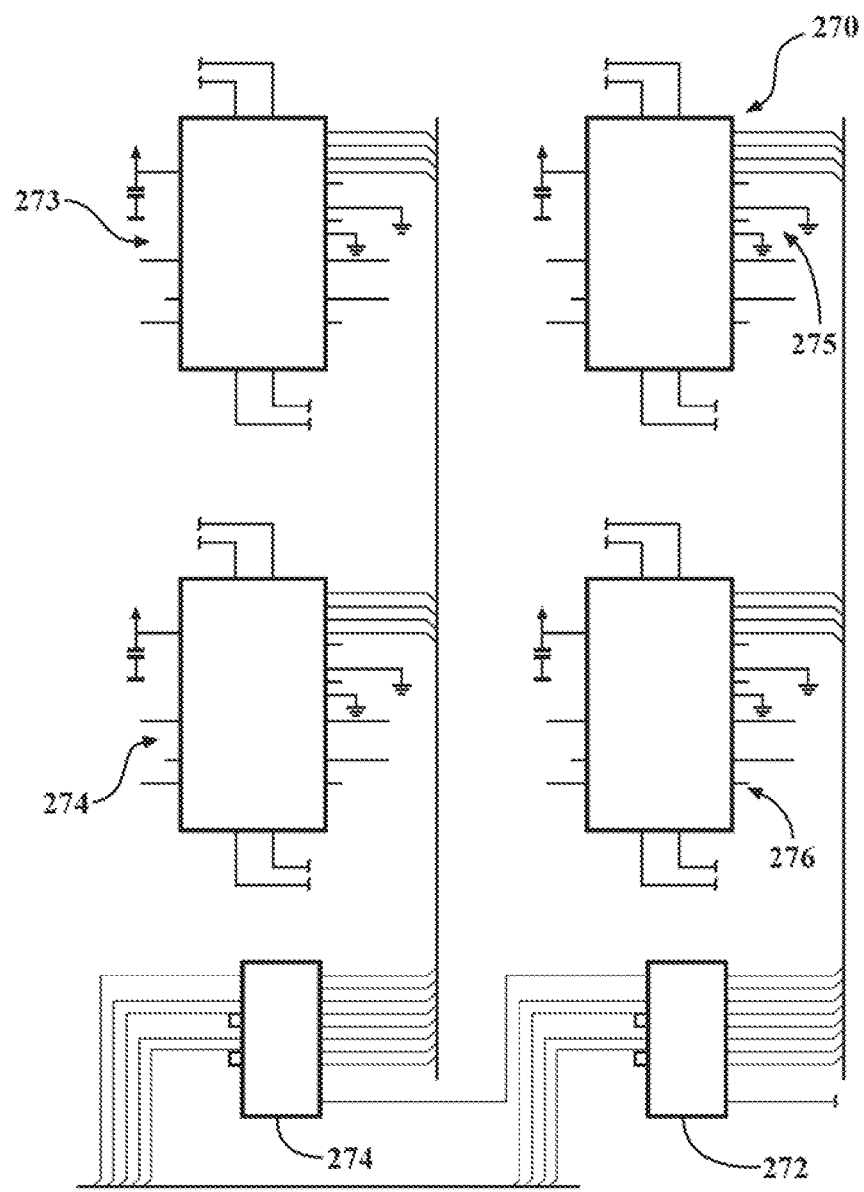
FIG. 16 is a line interface circuit for breaking a line connection.

Referring now to FIG. 16, a line interface circuit for breaking a line connection is shown. Latch chips 271 and 272 control the configuration of line interface chips 273-276. The signals through the switches 241-244 from FIG. 15 are routed through port pins on chips 273-276.

The foregoing discussion discloses and describes the preferred structure and control system for the present embodiment. However, one skilled in the art will readily recognize from such discussion, and from the accompanying drawings and claims, that various changes, modifications and variations can be made therein without departing from the true spirit and fair scope of the embodiment.

What is claimed is:

1. An intelligent switchable device for selectively conducting electricity, said device comprising:
   a switch for connecting a power line to a load, said switch having a control input;
   at least one sensor for producing a sensor signal indicative of a condition;

a transceiver for (i) transmitting data, including communications and (ii) receiving data, including remote instructions and rules;

non-volatile memory adapted for storing (i) a program having instructions and (ii) rules for determining whether to render said switch conductive or non-conductive;

a control circuit in communication with said transceiver, said sensor and said switch, said control circuit producing a command signal in response to a sensor signal as determined by said rules, said control circuit having a first mode of operation when the control circuit issues a command signal to render said switch in a conductive state and a second mode of operation when the control circuit issues a command signal to render said switch in a non-conductive state, and a third mode of operation where the rules command the switch to be non-conductive.

2. The intelligent switchable device for selectively conducting electricity as set forth in claim 1, wherein said control circuit comprises a fourth mode of operation where the control circuit issues a command signal to render said switch in a non-conductive state based on a remote command.

3. The intelligent switchable device for selectively conducting electricity as set forth in claim 1, wherein said condition is a condition of a power line.

4. The intelligent switchable device for selectively conducting electricity as set forth in claim 1, wherein said condition is a condition of a load.

5. The intelligent switchable device for selectively conducting electricity as set forth in claim 1, wherein said transceiver transmits communications indicative of a condition to a remote device.

6. The intelligent switchable device for selectively conducting electricity as set forth in claim 5, wherein said remote device is a monitor or a server.

7. The intelligent switchable device for selectively conducting electricity as set forth in claim 1, further comprising a vector network analyzer circuit operatively coupled to said control circuit, wherein said control circuit commands said vector network analyzer circuit to issue a test signal to a branch circuit.

* * * * *